United States Patent [19]
Van Kley

[11] Patent Number: 5,851,021
[45] Date of Patent: Dec. 22, 1998

[54] SHOCK ABSORBING TRAILER HITCH

[75] Inventor: Arnie Van Kley, Rock Valley, Iowa

[73] Assignee: Dethmers Manufacturing Company, Inc., Boyden, Iowa

[21] Appl. No.: 742,658

[22] Filed: Nov. 4, 1996

[51] Int. Cl.⁶ .................................................. B60D 1/00
[52] U.S. Cl. ...................................... 280/438.1; 280/489
[58] Field of Search ........................... 280/438.1, 439, 280/441.1, 483, 486, 487, 489, 490.1, 491.3, 491.4, 901

[56] References Cited

U.S. PATENT DOCUMENTS

| | | |
|---|---|---|
| 1,941,682 | 1/1934 | Gurton et al. |
| 2,448,744 | 9/1948 | Strader. |
| 2,809,851 | 10/1957 | Beck. |
| 2,863,674 | 12/1958 | Baade. |
| 3,073,624 | 1/1963 | Thomas. |
| 3,241,860 | 3/1966 | Janeway .................. 280/438.1 |
| 3,528,683 | 9/1970 | Janeway. |
| 3,588,145 | 6/1971 | Thompson ................ 280/406 |
| 3,863,956 | 2/1975 | Khan ....................... 280/483 |
| 3,918,744 | 11/1975 | Gay ......................... 280/438.1 |
| 4,195,861 | 4/1980 | Philipponi ................ 280/489 |
| 4,444,408 | 4/1984 | Goth ........................ 280/739 |
| 4,566,716 | 1/1986 | Modat ...................... 280/439 |
| 4,641,852 | 2/1987 | Kerst et al. ............... 280/489 |

FOREIGN PATENT DOCUMENTS

| | | |
|---|---|---|
| 528027 | 7/1956 | Canada. |
| 644659 | 1/1979 | U.S.S.R.. |

*Primary Examiner*—Kevin Hurley
*Attorney, Agent, or Firm*—Brian J. Laurenzo; Michael C. Gilchrist

[57] ABSTRACT

A hitching device is provided for connecting a trailer to a towing vehicle. The device reduces shocks and vibrations that can be transmitted between the trailer and the towing vehicle. The hitching device mounts on the rear section of the towing vehicle. A swing plate has hitching means attached to it for connection with the trailer. The swing plate is connected to swing means which allow the plate to swing forward or rearward. As the swing plate moves forward and rearward the hitching means remain at a constant angular orientation. The swing plate has a central position wherein the swing plate is at a lowest level. As the swing plate swings forward or rearward out of the central position it moves to a higher level. Gravity tends to force the swing plate back to the central position when the swing plate is displaced from the central position. The swing of the swing plate reduces shocks that typically are transmitted between the trailer and the towing vehicle. The tendency of the swing plate to be moved to the central position damps vibrations that can be transmitted between the trailer and the towing vehicle.

18 Claims, 3 Drawing Sheets

SHOCK ABSORBING TRAILER HITCH

BACKGROUND OF THE INVENTION

This invention relates generally to hitching devices for connecting a trailer to a towing vehicle, and more particularly to a shock-absorbing hitch for reducing shocks that can be transmitted during towing, especially during starting and stopping or on rough roads.

The problem of shocks being transmitted between a towing vehicle and a trailer during starting and stopping is well known. Similarly, vibrations transmitted between the trailer and the towing vehicle during towing on rough or uneven roads are well chronicled. Both can be unpleasant and uncomfortable for the driver and passengers of the towing vehicle. They can cause shifting and damage to cargo being hauled in the trailer. The problems can be especially acute when livestock are being carried in the trailer as it can cause distress or even injury to the livestock.

Several solutions for the problems have been proposed. For instance, spring arrangements such as shown in U.S. Pat. Nos. 2,448,744 and 1,941,682 have been used to reduce the shock that can be transmitted between a trailer and a towing vehicle. These arrangements require the added expense of fabricating and installing the spring, and the springs can be subject to fouling if not covered. Also, the hitches that utilize springs are only effective when hauling loads for which the springs are of the proper stiffness. If the load is heavier than intended the springs will be too soft. If a light load is hauled the springs may be too stiff.

Another proposed solution is to provide a pivoting support which allows for some fore and aft movement of the trailer relative to the towing vehicle. This solution is common in fifth wheel couplers used to connected semi-tractors and trailers. Examples can be found in U.S. Pat. Nos. 2,809,851, 3,073,624, 3,528,683, and 4,444,408. However, these pivoting supports allow the hitching means to tilt. This tilt is not desirable for hitches that utilize ball-type hitches, as it can cause increased stress and can cause the ball to pop out of the hitch.

Pneumatic or hydraulic shock absorbers have also been proposed, as in U.S. Pat. No. 3,863,956. However, these can be cost prohibitive and may require increased maintenance. It has been proposed to combine the pivoting supports with pneumatic or hydraulic shock absorbers as in Soviet Union Certificate of Invention 644,659 to provide a means for coupling semi-tractors and trailers. This combined coupling has the disadvantages of allowing the hitching means to tilt, being limited in effectiveness to those loads for which the shock absorbers are properly sized, and being cost prohibitive.

The difficulties encountered in the prior art and discussed above are substantially eliminated by the present invention.

SUMMARY OF THE INVENTION

Accordingly, it is an object of the present invention to provide a hitching device which will reduce the shock that can be transmitted between a trailer and a towing vehicle.

It is also an object of the present invention to provide a shock absorbing hitch wherein the hitching means are not tilted during fore and aft movement of the trailer relative to the towing vehicle.

It is an object of the present invention to provide a shock absorbing hitch which utilizes gravity to reduce the shocks that can be transmitted between the trailer and the towing vehicle.

It is another object of the present invention to provide a shock absorbing hitch that will work with loads of varying weights.

It is a further object of the present invention to provide a shock absorbing hitch which does not require springs, hydraulic means, or pneumatic means.

These and other objects will become apparent upon reference to the following specification, drawings, and claims.

By the present invention, it is proposed to meet these objectives and other more specific objectives which will become apparent as the description proceeds. To this end, a shock absorbing hitch for connecting a trailer to a towing vehicle and which reduces shocks that can be transmitted between the trailer and the towing vehicle particularly during starting and stopping is proposed. The hitch is for use between a towing vehicle that has a mounting base provided at a rearward section of the towing vehicle and a trailer that has hitch attachment means at a forward portion of the trailer for releasable operable connection with the shock absorbing hitch. The hitch allows the towing vehicle to pull the trailer in a generally forward direction, or push the trailer in a generally rearward direction. The shock absorbing hitch has a plate having hitching means for releasable operable connection with the trailer's hitch attachment means. Swing means are provided between the plate and the mounting base to allow for forward and rearward movement of the plate with respect to the mounting base. The swing means are connected to the plate such that as the plate moves forward or rearward with respect to the mounting base, the hitching means remains at a constant angular orientation relative to the mounting base.

In a preferred version, the plate has a central position wherein the plate is at a lowest level. If the plate is moved forward or rearward from the central position it moves to a higher level, and gravity will tend to urge the plate back to the central position.

DETAILED DESCRIPTION OF PREFERRED EMBODIMENTS

Figure 1:
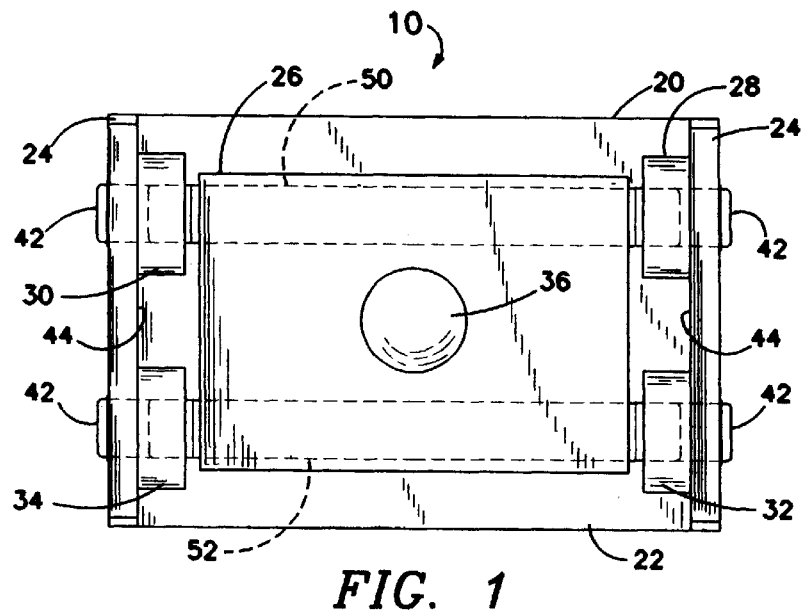
FIG. 1 is a plan view of a shock absorbing hitch in accordance to the present invention.

Shown generally in the figures is a shock absorbing hitch 10 for connecting a trailer 12 to a towing vehicle 14. The hitch 10 is mounted on a rear section 16 of the towing vehicle 14. A hitch ball receiver 38 extends from a front section 18 of the trailer 12 and is releaseably connectable with the shock absorbing hitch 10. When in connection between the towing vehicle 14 and the trailer 12, the shock absorbing hitch 10 allows pulling or pushing forces to be transmitted from the self-propelled towing vehicle 14 to the passive trailer 12. When the rear section 16 of the towing vehicle 14 moves away from the front section 18 of the trailer 12, the towing vehicle 14 pulls the trailer 12. When the rear section 16 of the towing vehicle 14 moves toward the front section 18 of the trailer 12, the towing vehicle 14 pushes the trailer 12. For the purposes of this application, the direction of pull will be referred to as forward, and the direction of push will be referred to as rearward.

Looking specifically at FIG. 1, a plan view of a preferred embodiment of the shock absorbing hitch is shown. A mounting base 20 is used to fix the shock absorbing hitch 10 to the rear section 16 of the towing vehicle 12. The mounting base 20 has a base plate 22, which rests flush on a horizontal surface of the towing vehicle 12, and two upright sidewalls 24 which extend from opposite edges of the base plate 22. A swing plate 26 is suspended between the sidewalls 24 by a first forward link 28, a second forward link 30, a first rearward link 32, and a second rearward link 34. The forward pair of links 28, 30 form a first pendulum means and the rearward pair of links form a second pendulum means. Together, the first pendulum means 28, 30 and the second pendulum means 32, 34 form a swing means which allows the swing plate 26 to move forward and rearward relative to the mounting base 20. A standard hitching ball 36 is bolted to the center of the swing plate 26 to act as a hitching means for releasable connection with the standard hitch ball receiver 38 connected to the front section 18 of the trailer 12; though it will be obvious to those skilled in the art that other hitching means may be substituted for the hitching ball 36, and other hitch attachment means may be substituted for the hitch ball receiver 38. It is contemplated that the mounting base 20, the links 28–34, and the swing plate 26 will be constructed of hardened steel; however, other rigid durable materials may be substituted.

Figures 2, 3:
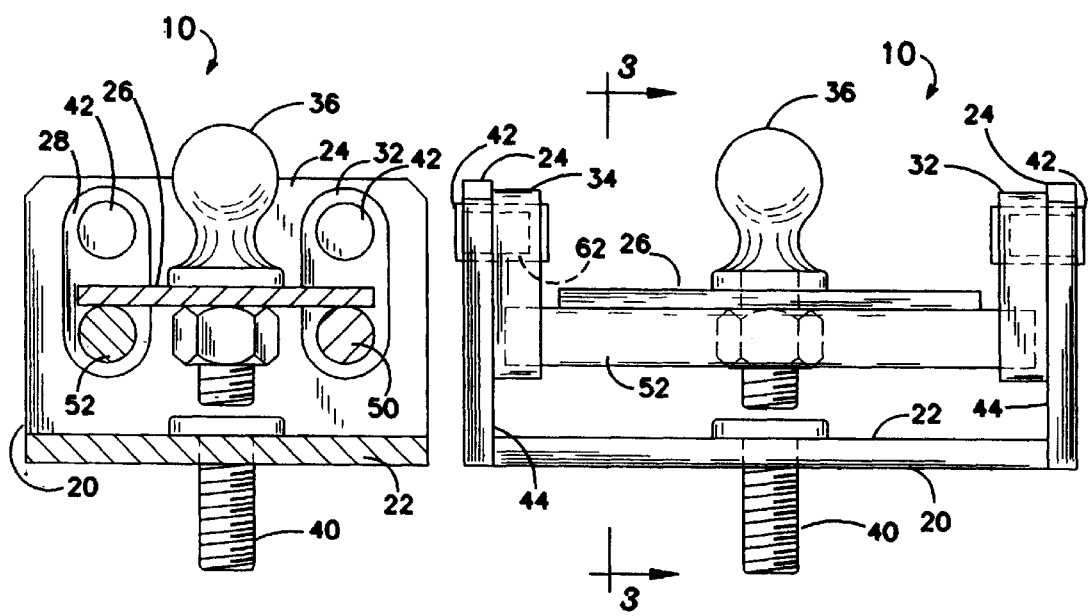
FIG. 2 is a rear elevational view of the shock absorbing hitch of FIG. 1.
FIG. 3 is a cross-sectional elevation view from line 3—3 of FIG. 2.

As can be seen in FIG. 2, a tang 40 is provided through the base plate 22 to anchor the shock absorbing hitch 10 to the rear section 16 of the towing vehicle 14. In the preferred embodiment this tang 40 is adapted to fit in the hole commonly used to receive the bolt portion of a standard hitching ball. Obviously, other means, such as multiple bolts or weldments, may be used to secure the shock absorbing hitch 10 to the towing vehicle 14. However, the preferred embodiment allows the shock absorbing hitch 10 to be used in place of a standard ball-type hitch without modifying the rear section 16 of the towing vehicle 14.

Figures 5, 6:
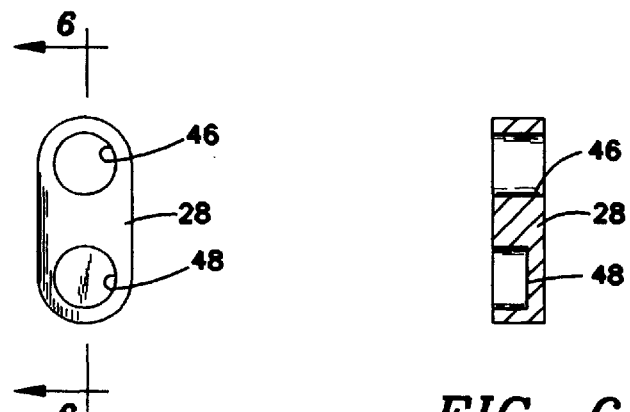
FIG. 5 is an elevational detail view of a link in accordance with the present invention.
FIG. 6 is a cross-sectional elevation view from line 6—6 of FIG. 5.

A pair of pivot pins 42 extend from an inside surface 44 of each sidewall 24. Each link 28, 30, 32, 34 is pivotally journalled on one of the pivot pins 42 at an upper opening 46 in the link 28, 30, 32, 34. A lower socket 48 is also provided in each link 28, 30, 32, 34 (FIGS. 5 & 6). The links 28, 30, 32, 34 are mounted so that the sockets 48 face inward. A front axle 50 is received in the sockets 48 of the first and second forward links 28, 30, so that the front axle 50 is retained between the first and second forward links 28, 30. The front axle 50 therefore connects the first forward link 28 with the second forward link 30, so that the first and second forward links 28, 30 pivot together as the first pendulum means. A rear axle 52 is similarly received by the sockets 48 of the first and second rearward links 32, 34, so that the first rearward link 32 and the second rearward link 34 pivot together as the second pendulum means.

In a preferred embodiment, self-lubricating bushings 62 are provided on the pivot pins 42 to reduce friction between the links 28–34 and the pivot pins 42. Similar bushings may also be provided on the axles 50, 52 to reduce friction and wear between the axles 50, 52 and the sockets 48. These bushings 62 may be made of oil impregnated metal, ultra-high molecular weight (UHMW) polyethylene or other similar friction reducing material. In a preferred embodiment the bushings 62 are made of molydisulfide impregnated nylon, commonly sold under the tradename NYLATRON. Oil impregnated washers may be used as well to reduce friction. These friction reducing bushings 62 and washers eliminate the need to provide grease slots in the shock absorbing hitch 10 to allow for lubrication of the moving parts.

The links 28, 30, 32, 34 hang from the pivot pins 42 so that the sockets 48 are aligned directly below the pivot pins 42. The swing plate 26 is mounted on top of the front and rear axles 50, 52 by weldments or similar means. The swing plate 26 thereby connects the front axle with the rear axle so that the first and second pendulum means must swing together as a single swing means. The axles 50, 52 are free to rotate within the sockets 48 so that a forward or rearward push on the swing plate 26 will pivot the links 28, 30, 32, 34 about the pivot pins 42 and about the axles 50, 52. The distance between the upper openings 46 and the lower sockets 48 should be the same on all the links 28, 30, 32, 34, so that as the links 28, 30, 32, 34 pivot together about the pivot pins 42, the swing plate 26 will not tilt relative to the mounting base 20. Similarly, the swing plate 26 should be attached to the links 28, 30, 32, 34 so that the links 28, 30, 32, 34 are all in the same position relative to vertical.

Figure 4:
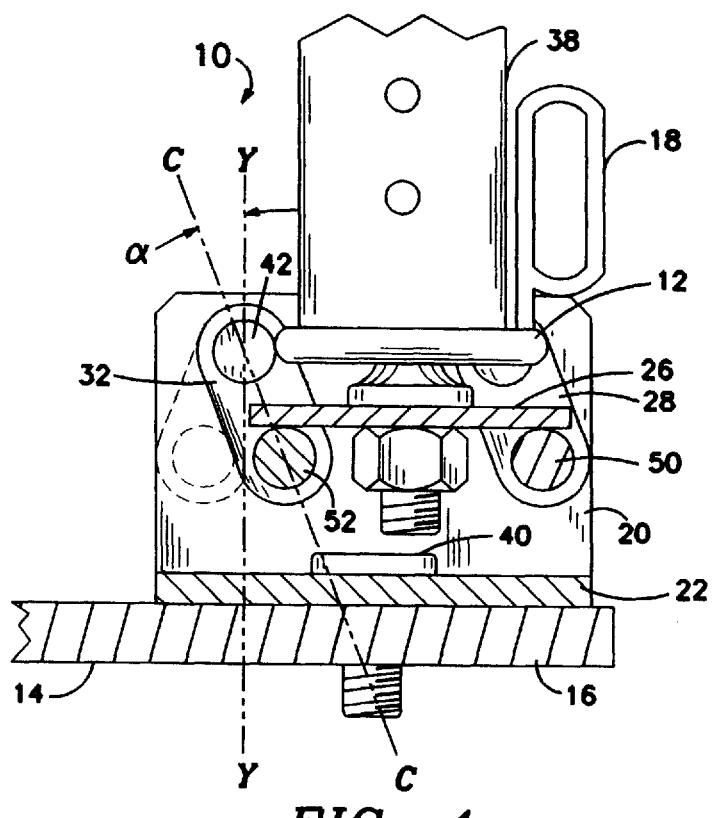
FIG. 4 is the shock absorbing hitch of FIG. 3, with the plate displaced from the central position to a rearward position.

For the sake of illustration, an imaginary vertical axis Y-Y is shown in FIG. 4, which passes through the center of the pivot pins 42. An imaginary centerline C-C is shown which passes through the center of the pivot pin 42 and the center of the axle 52. At any given time, an angle $\alpha$ between the centerline C-C and the vertical axis Y-Y for any link 28, 30, 32, 34 is substantially equal to the angle $\alpha$ for the remaining links. When the swing plate 26 is in a central position (FIGS. 2 and 3), the angle $\alpha$ is approximately equal to zero for each link 28, 30, 32, 34. In the central position, the swing plate 26 is at a lowest point. Gravity tends to urge the swing plate 26 into the central position. When the swing plate 26 is pushed forward or rearward out of the central position (FIG. 4), the swing plate 26 must move correspondingly upwards as the links 28, 30, 32, 34 are moved away from the lowest point in their arc. The weight of the trailer 12 that is supported by the shock absorbing hitch 10, or the tongue weight as it is commonly known, therefore tends to resist the forward and rearward movement of the swing plate 26, and tends to move the swing plate 26 back to the central position if it is displaced. The resistance to forward and rearward movement of the swing plate 26 due to gravity can be measured by the formula $R = W \cdot \tan(\alpha)$, wherein R is the resistance force and W is the tongue weight of the trailer 12. It can be seen from this formula that as the swing plate is displaced farther and farther from the central position the resistance force increases.

In use, the hitch ball receiver 38 is placed over the hitching ball 36 and locked into place to connect the trailer 12 to the towing vehicle 14. The trailer 12 is thereby coupled to the towing vehicle 14 so that the towing vehicle 14 can pull the trailer 12 in the forward direction, or push the trailer 12 in the rearward direction. As the towing vehicle 14 pulls forward from rest, mounting base 20 is pulled forward by the tang 40 or other connection with the towing vehicle 14. This causes the swing plate 26 and the links 28–34 to be swung rearward relative to the mounting base 20 by the stationary trailer 12. As the swing plate 26 is moved away from the central position, the swing plate 26 raises due to the arc of the links 28–34 (FIG. 4). The tongue weight of the trailer 12 pressing down on the hitching ball 36 therefore tends to increasingly resist the rearward swing of the swing plate 26. The rearward swing causes the tractive force of the towing vehicle 14 to be applied gradually to the trailer 12 so that the trailer 12 does not jerk forward as can happen with traditional hitches upon starting. Similarly, when the trailer 12 approaches the towing vehicle 14 during stopping, the momentum of the trailer vehicle 12 transfers gradually to the towing vehicle 14 as the swing plate 26 swings forward past the central position. The swing of the links 28–34 and the swing plate 26 also absorbs vibrations that can be transmitted between the towing vehicle 14 and the trailer 12 during towing. The tongue weight of the trailer acting on the hitch ball tends to force the swing plate 26 toward the central position, so that swing of the swing plate 26 will be damped. Because the damping of the vibrations and the resistance to the swing is created by the tongue weight of the trailer 12, the shock absorbing hitch 10 is suitable for use with trailers of various tongue weights.

An important feature of the shock absorbing hitch 10 is that the hitching ball 36 remains at a constant angular orientation relative to the base plate 22 throughout any forward or rearward swing. This allows for a more secure connection between the hitching ball 36 and the hitch ball receiver 38, and reduces wear on the contact surfaces of the hitching ball 36 and the hitch ball receiver 38 that can occur as the hitching ball 36 and the hitch ball receiver 38 rotate relative to each other. This is accomplished by having the first and second pendulum means be of the same length, and attaching the swing plate 26 between the pendulum means so that the first pendulum means is always in the same position in its arc as the second pendulum means. This assures that the front and rear edges of the swing plate 26 rise and fall at the same rate so that the swing plate 26 will not tilt as it moves forward and rearward. In the preferred embodiment the links 28–34 are all the same length. The swing plate 26 is attached to the axles 50, 52 such that the angle α is the same for each link. Accordingly, the swing plate 26 is constrained to translating fore and aft and up and down without tilting. The hitching ball 36 therefore remains at a constant angular orientation relative to the mounting base 20.

Figure 7:
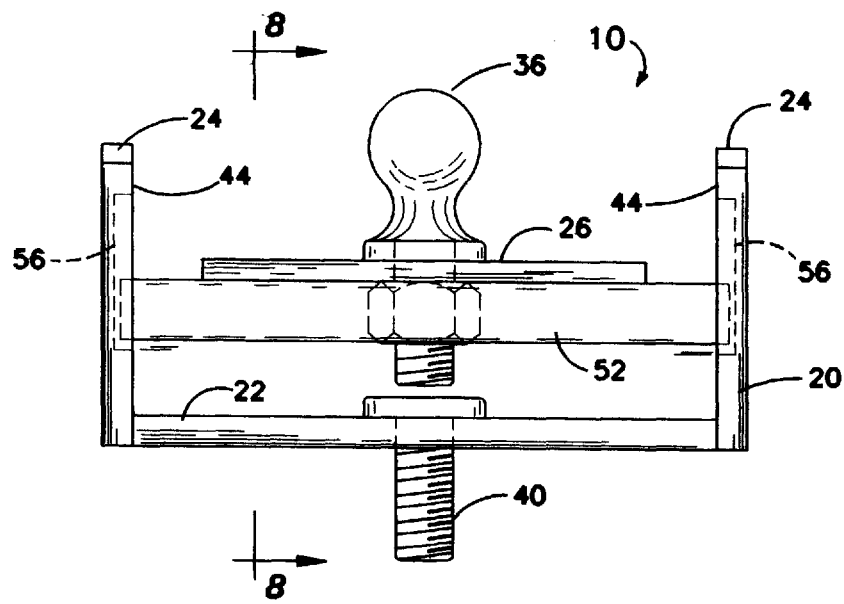
FIG. 7 is a rear elevational view of an alternative embodiment of a shock absorbing hitch according to the present invention, which uses circular links.
Figure 8:
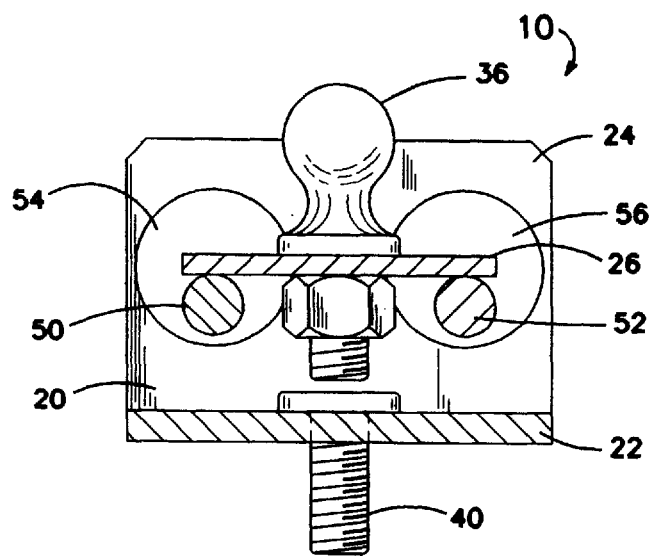
FIG. 8 is a cross-sectional elevational view from line 8—8 of FIG. 7.

An alternative embodiment is shown in FIGS. 7 & 8 that uses circular disks 54, 56 instead of links 28–34 to form the swing means. A front pair 54 and a rear pair 56 of the circular disks form the first and second pendulum means. The disks 54, 56 fit within the sidewalls 24 like puzzle pieces. No pins are needed to hold the disks 54, 56 in place.

The shock absorbing hitch of the present invention is adaptable to fit a wide variety of towing vehicles 14 and trailers 12. The embodiments shown are especially well suited for use with goose-neck type trailer connections, particularly of the kind commonly used to haul livestock. However, the invention is in no way so limited. For instance, it would be obvious to modify the shock absorbing hitch 10 for use with a fifth wheel hitch of the type commonly used on semi-tractors and trailers. Because the resistance force to displacement from the central position is dependent on the tongue weight of the trailer 12, the shock absorbing hitch 10 will work for hauling loads of various sizes.

The foregoing description and drawings merely explain and illustrate preferred embodiments of the invention, and the invention is not limited thereto, except insofar as the claims are so limited. Those skilled in the art, who have the disclosure before them, will be able to make modifications and variations therein without departing from the scope of the invention. For example, while the links 28–34 of the shown embodiment are suspended from vertical sidewalls 24, it is contemplated that other means could be used to suspend the links 28–34.

What is claimed is:

1. A shock absorbing hitch for connecting a trailer to a towing vehicle which reduces shocks that can be transmitted between the trailer and the towing vehicle particularly during starting and stopping, wherein the towing vehicle can pull the trailer in a generally forward direction and push the trailer in a generally rearward direction, and wherein the trailer is provided with hitch attachment means at a forward portion of the trailer for releasable operable connection to the shock absorbing hitch, the shock absorbing hitch comprising:

a mounting base for attachment to a rearward section of the towing vehicle;

a plate having hitching means for releasable operable connection with the hitch attachment means; and swing means operably connected between said plate and the mounting base to allow said plate to move forward and rearward with respect to the mounting base, said swing means connected to said plate such that said hitching means remains at a constant angular orientation relative to the mounting base as said plate swings forward and rearward, said swing means further connected to said plate such that when said mounting base is attached to said rear section of the towing vehicle said plate has a central position wherein said plate is at a lowest level, and wherein as said plate moves forward or rearward from said central position said plate moves to a higher level.

2. The shock absorbing hitch according to claim 1, wherein when said plate has been moved forward or rearward from said central position, gravity tends to urge said plate towards said central position.

3. The shock absorbing hitch according to claim 1, wherein said swing means comprises a first pendulum means pivotally connected to the mounting base and a second pendulum means pivotally connected to the mounting base rearward from said first pendulum means.

4. The shock absorbing hitch of claim 3, wherein said first pendulum means comprises a forward pair of links, and wherein said second pendulum means comprises a rearward pair of links.

5. The shock absorbing hitch of claim 4, wherein:

said plate comprises a forward axle having a first end and a second end opposite from said first end and a rearward axle parallel to said forward axle having a first end and a second end opposite from said first end;

said forward pair of links comprises a first forward link pivotally connected with said first end of said forward axle and a second forward link pivotally connected with said second end of said forward axle; and said rearward pair of links comprises a first rearward link pivotally connected with said first end of said rearward axle and a second rearward link pivotally connected with said second end of said rearward axle.

6. The shock absorbing hitch according to claim 1, wherein said mounting base comprises a pair of sidewalls, wherein said sidewalls are oriented substantially vertically when said mounting base is attached to said rear section of the towing vehicle, and wherein said swing means are operably connected to said mounting base at said sidewalls.

7. The shock absorbing hitch according to claim 6, wherein said swing means are circular disks that are fit into the sidewalls.

8. A shock absorbing hitch for connecting a trailer to a towing vehicle which reduces shocks that can be transmitted between the trailer and the towing vehicle particularly during starting and stopping, wherein the towing vehicle can pull the trailer in a generally forward direction and push the trailer in a generally rearward direction, and wherein the trailer is provided with hitch attachment means at a forward portion of the trailer for releasable operable connection to the shock absorbing hitch, the shock absorbing hitch comprising:

a mounting base at a rearward section of the towing vehicle for fixing the shock absorbing hitch to the towing vehicle a plate having hitching means for releasable operable connection with the hitch attachment means; and swing means operably connected between said plate and said mounting base to allow said plate to move forward and rearward with respect to the mounting base, said swing means connected to said plate such that said hitching means remains at a constant angular orientation relative to the mounting base as said plate swings forward and rearward, and said swing means connected to said plate such that said plate has a central position wherein said plate is at a lowest level, and wherein as said plate moves forward or rearward from said central position said plate moves to a higher level than said lowest level.

9. The shock absorbing trailer hitch according to claim 8 wherein when said plate has been moved forward or rearward from said central position, gravity tends to urge said plate toward said central position.

10. The shock absorbing hitch according to claim 8, wherein said swing means comprises a first pendulum means pivotally connected to the mounting base and a second pendulum means pivotally connected to the mounting base rearward from said first pendulum means.

11. The shock absorbing hitch of claim 10, wherein said first pendulum means comprises a forward pair of links, and wherein said second pendulum means comprises a rearward pair of links.

12. The shock absorbing hitch of claim 11, wherein:

said plate comprises a forward axle having a first end and a second end opposite from said first end and a rearward axle parallel to said forward axle having a first end and a second end opposite from said first end;

said forward pair of links comprises a first forward link pivotally connected with said first end of said forward axle and a second forward link pivotally connected with said second end of said forward axle; and said rearward pair of links comprises a first rearward link pivotally connected with said first end of said rearward axle and a second rearward link pivotally connected with said second end of said rearward axle.

13. The shock absorbing hitch according to claim 8, wherein said mounting base comprises a pair of sidewalls, wherein said sidewalls are oriented substantially vertically when said mounting base is attached to said rear section of the towing vehicle, and wherein said swing means are operably connected to said mounting base at said sidewalls.

14. The shock absorbing hitch according to claim 13, wherein said links are circular disks that are fit into the sidewalls.

15. A shock absorbing hitch for connecting a trailer to a towing vehicle which reduces shocks that can be transmitted between the trailer and the towing vehicle, particularly during starting and stopping, wherein the towing vehicle can pull the trailer in a generally forward direction and can push the trailer in a generally rearward direction, and wherein the trailer is provided with hitch attachment means at a forward portion of the trailer for releasable operable connection with the shock absorbing hitch, the shock absorbing hitch comprising:

a mounting base fixed to a rearward section of the towing vehicle, said mounting base having a first and a second vertically extending sidewalls, each of said sidewalls having an inside surface facing said other sidewall's inside surface;

a pair of forward links, one of said forward links pivotally attached to said inside surface of said first vertically extending sidewall and the other forward link pivotally attached to said inside surface of said second sidewall;

a forward axle rotatably received by said forward links between said sidewalls, said forward axle connecting said forward links such that they swing forward and rearward as a unit;

a pair of rearward links, one of said rearward links pivotally attached to said inside surface of said first vertically extending sidewall and the other rearward link pivotally attached to said inside surface of said second sidewall;

a rearward axle rotatably received by said rearward links between said sidewalls, said rearward axle connecting said rearward links such that they swing forward and rearward as a unit; and a swing plate having a hitching ball extending from an upper surface thereof, said swing plate being supported by said forward and rearward axles such that said swing plate swings forward and rearward with respect to said mounting base as said links swing forward and rearward, said swing plate having a central position wherein said swing plate is at a lowest level, as said swing plate swings forward or rearward from said central position said swing plate remains at a constant angular orientation relative to said mounting base, as said swing plate swing forward or rearward from said central position said swing plate moves to a higher level than said lowest level, and gravity urges said swing plate toward said central position whenever said swing plate is displaced from said central position.

16. A shock absorbing hitch in combination with a towing vehicle for use in towing a trailer having hitch attachment means at a forward portion of the trailer for releasable operable connection to the shock absorbing hitch, said combination comprising:

a towing vehicle having a rearward portion;

a mounting base attached to said rearward portion of said towing vehicle, said mounting base comprising two substantially vertical sidewalls;

swing means pivotally connected to said sidewalls such that said swing means can swing forward and rearward; and hitching means suspended on said swing means such that said hitching means swing forward and rearward in conjunction with said swing means and such that said hitching means remains at a constant angular orientation relative to said mounting base as said hitching means swings forward and rearward.

17. The combination of claim 16, wherein said swing means are two pairs of links pivotally attached to said sidewalls.

18. The combination of claim 16, wherein said swing means has a central position in which said hitching means is at a lowest level, and wherein as said hitching means on said swing means moves forward or rearward from said central position said hitching means moves to a level higher than said lowest level such that as said hitching means is moved forward or rearward from said central position gravity urges said hitching means back towards said central position.

* * * * *